(12) United States Patent
Ruutu et al.

(10) Patent No.: US 7,092,358 B2
(45) Date of Patent: Aug. 15, 2006

(54) SYSTEM AND METHOD FOR FACILITATING FLEXIBLE QUALITY OF SERVICE

(75) Inventors: Jussi Ruutu, Espoo (FI); Marko Suoknuuti, Espoo (FI)

(73) Assignee: Nokia Corporation, Espoo (FI)

( * ) Notice: Subject to any disclaimer, the term of this patent is extended or adjusted under 35 U.S.C. 154(b) by 65 days.

(21) Appl. No.: 10/693,002

(22) Filed: Oct. 24, 2003

(65) Prior Publication Data

US 2005/0089042 A1    Apr. 28, 2005

(51) Int. Cl.
*G01R 31/08* (2006.01)
*H04J 3/14* (2006.01)
*H04L 12/56* (2006.01)

(52) U.S. Cl. .............. 370/230; 370/395.42; 370/236; 370/395.21

(58) Field of Classification Search ............. 370/229, 370/236, 235, 230, 237, 230.1, 395.42, 395.21
See application file for complete search history.

(56) References Cited

U.S. PATENT DOCUMENTS

| | | | | |
|---|---|---|---|---|
| 5,828,653 | A * | 10/1998 | Goss | 370/230 |
| 6,021,116 | A * | 2/2000 | Chiussi et al. | 370/236 |
| 6,252,848 | B1 * | 6/2001 | Skirmont | 370/229 |
| 6,400,684 | B1 * | 6/2002 | Benmohamed et al. | 370/230.1 |
| 6,535,482 | B1 * | 3/2003 | Hadi Salim et al. | 370/229 |
| 6,614,757 | B1 * | 9/2003 | Rochberger et al. | 370/231 |
| 6,625,118 | B1 * | 9/2003 | Hadi Salim et al. | 370/229 |
| 6,631,135 | B1 * | 10/2003 | Wojcik | 370/395.21 |
| 6,675,211 | B1 * | 1/2004 | Mamaghani et al. | 709/224 |
| 6,744,767 | B1 * | 6/2004 | Chiu et al. | 370/395.21 |
| 6,822,940 | B1 * | 11/2004 | Zavalkovsky et al. | 370/237 |
| 6,826,147 | B1 * | 11/2004 | Nandy et al. | 370/229 |
| 2002/0181394 | A1 * | 12/2002 | Partain et al. | 370/229 |
| 2002/0191622 | A1 * | 12/2002 | Zdan | 370/401 |
| 2003/0081547 | A1 * | 5/2003 | Ho | 370/229 |
| 2003/0088690 | A1 * | 5/2003 | Zuckerman et al. | 709/232 |
| 2003/0112756 | A1 * | 6/2003 | Le Gouriellec et al. | 370/230 |

(Continued)

FOREIGN PATENT DOCUMENTS

WO    WO 02/052801    7/2002

OTHER PUBLICATIONS

J. Heinanen et al., Assured Forwarding PHB Group, Jun. 1999, pp. 1-10.

(Continued)

*Primary Examiner*—Alpus H. Hsu
*Assistant Examiner*—Steve Blount
(74) *Attorney, Agent, or Firm*—Hollingsworth & Funk, LLC

(57) ABSTRACT

A system and method of providing flexible QoS actions through communication to neighboring network elements of the local QoS actions taken by the local network element. The neighboring network elements may then take into account the QoS actions taken by the local network element when the neighboring network elements are contemplating their own QoS actions to be taken. Thus, a limited range of visibility of QoS actions facilitates subsequent QoS actions taken by the network elements within the limited range of visibility.

20 Claims, 6 Drawing Sheets

U.S. PATENT DOCUMENTS

| | | | |
|---|---|---|---|
| 2003/0202476 A1* | 10/2003 | Billhartz et al. | 370/236 |
| 2003/0231594 A1* | 12/2003 | Xu et al. | 370/236 |
| 2004/0022191 A1* | 2/2004 | Bernet et al. | 370/230 |
| 2004/0081093 A1* | 4/2004 | Haddock et al. | 370/230 |
| 2004/0090914 A1* | 5/2004 | Briscoe et al. | 370/229 |
| 2004/0090917 A1* | 5/2004 | Ruutu et al. | 370/235 |
| 2005/0007954 A1* | 1/2005 | Sreemanthula et al. | 370/229 |

OTHER PUBLICATIONS

S. Blake et al., An Architecture for Differentiated Services, Dec. 1998, pp. 1-33.

K. Nichols et al., Definition of the Differentiated Services Field (DS Field) in the IPV4 and IPV6 Headers, Dec. 1998. pp. 1-18.

* cited by examiner

SYSTEM AND METHOD FOR FACILITATING FLEXIBLE QUALITY OF SERVICE

FIELD OF THE INVENTION

This invention relates in general to communications, and more particularly to a system and method for providing flexible quality of service.

BACKGROUND OF THE INVENTION

While computers are still used for their traditional processing purposes, advances in communication infrastructures and protocols have turned standard computing devices into valuable communication tools. Computers communicate with each other, and with other electronic devices, over networks ranging from local area networks (LANs) to wide reaching global area networks (GANs) such as the Internet. Other electronic devices have experienced similar transformations, such as mobile phones, personal digital assistants (PDAs), and the like. Today, these wireless devices are being used for a variety of different types of communication. For example, while the analog mobile phone was traditionally used for analog voice communications, the mobile phone of the present and future is a powerful communication tool capable of communicating voice, data, images, video, and other multimedia content. PDAs, once the portable calendaring and organizational tool, now often include network communication capabilities such as e-mail, Internet access, etc. With the integration of wireless and landline network infrastructures, information of all sorts can be conveniently communicated between wireless and landline terminals.

In carrying out such communications between devices, the programs, applications, application instances, and the like (hereinafter "applications") operable on such devices often need to communicate with applications on other devices. For example, an application at the application layer may generate messages that are communicated to lower levels of the software architecture including, e.g., the transport layer, network layer, data link layer, and physical layer, where the encapsulated messages are transmitted over the network to other devices. Messages received at the receiving device move up the software architecture to ultimately provide the original message to an application on the receiving device.

Modern packet data networks, such as Internet Protocol (IP) networks, are in wide use today and they employ such a hierarchical architecture. IP networks are arranged to operate end-to-end between network hosts and corresponding network terminals, where IP routers supply, for example, data packet forwarding functionality. Exemplary transport protocols implemented within the transport layer include: User Datagram Protocol (UDP), which allows a connectionless datagram service where connection setup is not needed or when overhead should be reduced; and Transmission Control Protocol (TCP) that allows connection-oriented reliable delivery with congestion control and retransmission for data recovery.

Congestion in a network is loosely defined as a condition where demand for resources, e.g., bandwidth, Central Processing Unit (CPU) time, or memory, exceeds capacity. Congestion control aims to alleviate the problems caused by congestion, where congestion control may be divided to two parts: congestion avoidance; and congestion recovery. Congestion avoidance tries to prevent demand from exceeding capacity, while congestion recovery tries to restore an operative state. It is possible for network entities, such as IP routers, network hosts and network terminals, to contribute to both of these mechanisms. When a network entity, such as an IP router, receives a packet beyond its storage capacity, it must implement a data reduction algorithm in order to prevent data overflow, while maintaining adherence to the applicable Quality of Service (QoS) policy that may be in force. In order to achieve the varying QoS levels enforced by the IP network, the IP router may utilize data packet queues to facilitate, for example: packet drop; packet transfer delay; prioritized packet transmission; or data packet modification and data packet repack.

One example of a QoS network is based upon the Differentiated Services (DiffServ) framework that has been standardized by the Internet Engineering Task Force (IETF). The basic idea of DiffServ networks is that ingress data packets receive stamps called DiffServ codepoints at the point of ingress, or at the edge of the DiffServ network. IP routers that subsequently come into contact with the data packet then base their handling of the data packet upon the value of the DiffServ codepoint. For example, if there is a high enough level of congestion in the IP router, then the IP router can start to drop packets with low enough priority classes in accordance with the associated DiffServ codepoint. This QoS handling of the data packet, however, is performed locally by each individual IP router, based upon the initial DiffServ codepoint, without consideration for QoS actions taken by neighboring IP routers.

Voice over IP (VoIP) calls, or video streaming, is one example of an application that may be adversely affected by such localized handling of data packets. Normally, this kind of application can handle data interruptions, such as packet loss or delayed packets, if they are separated in time. Upon such a data interruption, the applications, e.g., audio codecs, may employ data replay, for example, of the last successfully received data packet. In many cases, the data replay results in little, if any, data interruption detection by the user. If, however, the QoS related actions to the same connection occur consecutively, or too frequently, then the application will likely fail due to an intolerable decrease in QoS caused by the consecutive data loss.

Additionally, if other IP routers in the forwarding path select the same data connection for QoS actions, then a possibility exists that the cumulative QoS actions of the daisy chained IP routers will adversely affect the final QoS of the affected connection path. Thus, from an end-to-end (e2e) point of view, the receiving application is still the recipient of excessively delayed, or even dropped, data packets. QoS methods employing the end-to-end (e2e) methodology, e.g., Integrated Services, have been implemented to alleviate problems associated with the local QoS operations. The e2e QoS methods developed by the IETF, however, require heavy control, signalling, and management functions to be implemented within the IP routers and thus have not enjoyed widespread use due to their excessive processing requirements.

It would, therefore, be desirable to implement a QoS solution that provides an expanded view of the cumulative QoS operations being performed on a particular data connection, while decreasing the amount of processing required of the e2e QoS methods. The present invention provides a solution to these and other problems of the prior art, and provides many advantages over prior art QoS methodologies.

SUMMARY OF THE INVENTION

To overcome limitations in the prior art described above, and to overcome other limitations that will become apparent upon reading and understanding the present specification, the present invention discloses a system and method for providing limited visibility of QoS actions taken by neighboring network elements.

In accordance with one embodiment of the invention, a method for distributing Quality of Service (QoS) information among network entities to flexibly promote fair congestion processing comprises monitoring a congestion level within a network entity. The method further comprises performing a QoS action in response to determining that the congestion level exceeds a congestion threshold, and communicating the QoS action to at least one other network entity. The at least one other network entity alters its congestion processing in response to the QoS action taken by the network entity.

In accordance with another embodiment of the invention, a system for distributing Quality of Service (QoS) actions in accordance with precedence priorities to promote fair congestion processing within a network comprises a network element coupled to a boundary of the network. The system further comprises a first forwarding terminal coupled to exchange a plurality of data streams with the network element and is adapted to implement QoS actions on a first portion of the plurality of data streams. The first portion of the plurality of data streams receives a first precedence priority in response to the QoS actions. The system further comprises a second forwarding terminal coupled to exchange the plurality of data streams with the first forwarding terminal and is coupled to receive signalling indicative of the QoS actions implemented by the first forwarding terminal. The QoS actions taken by the second forwarding terminal are performed upon a second portion of the plurality of data streams having a second precedence priority equal to or higher than the first precedence priority.

In accordance with another embodiment of the invention, a communication device operable on a network comprises a routing unit coupled to receive a plurality of data streams from the network. The plurality of data streams contain signalling indicative of prior Quality of Service (QoS) actions taken on the plurality of data streams. The communication device further comprises a buffering unit adapted to temporarily store the plurality of data streams received from the routing unit, and a congestion control unit adapted to monitor a storage level of the buffering unit. The communication device further comprises a QoS unit adapted to perform QoS actions on the plurality of data streams. The QoS actions taken by the QoS unit are adapted to reduce the storage level of the buffering unit by dropping packets of data from the plurality of data streams whose signalling indicates a lack of prior QoS actions.

In accordance with another embodiment of the invention, a computer-readable medium having instructions stored thereon are executable by a computing system. The instructions apply Quality of Service (QoS) actions on data streams exchanged between at least two applications over a network. The instructions perform steps comprising receiving data streams from the at least two applications, where the data streams include signalling information indicative of prior QoS actions. The instructions further perform steps comprising applying a QoS action on one of the at least two data streams in response to detecting a need to perform the QoS action. The application of the QoS action retrieves a history of prior QoS actions taken on each of the at least two data streams and prioritizes the history of prior QoS actions, where prior QoS actions taken most recently receive a low priority. The application of the QoS action further selects one of the at least two data streams having a priority level equal to or greater than the low priority and applies the QoS action to the selected data stream.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration representative embodiments in which the invention may be practiced. It is to be understood that other embodiments may be utilized, as structural and operational changes may be made without departing from the scope of the present invention.

Generally, the present invention provides a system and method of providing flexible QoS actions, whereby the local QoS action taken by a particular network element may communicate the local QoS action to neighboring network elements. As a result, the neighboring network elements may take into account the QoS actions taken by surrounding network elements when the neighboring network elements are contemplating their own QoS actions to be taken. Thus, a limited range of visibility of QoS actions taken within a portion of a network facilitates subsequent QoS actions taken by the network elements within the limited range of visibility.

Figure 1:
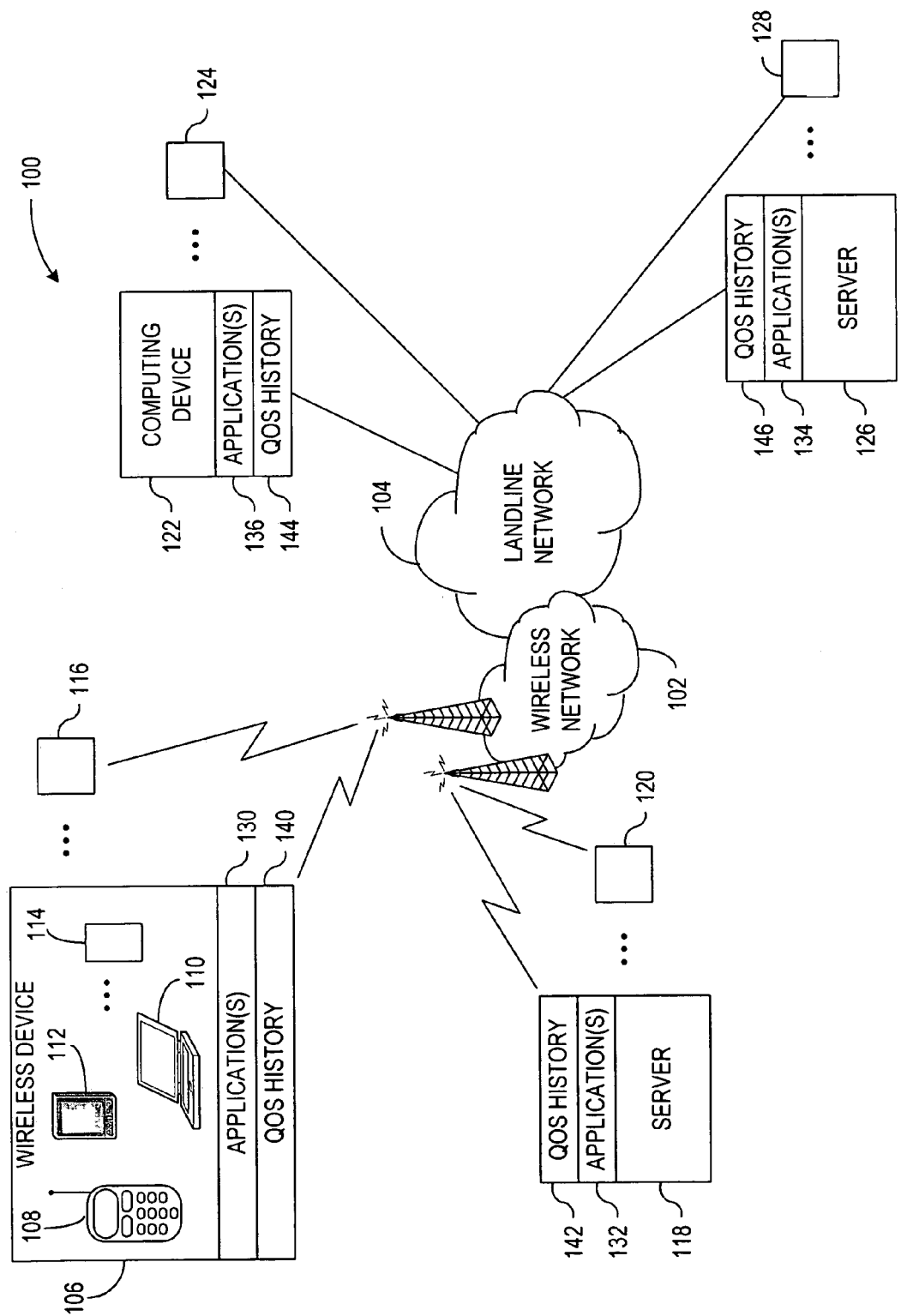
FIG. 1 is an exemplary block diagram of a networking environment in which the principles of the present invention are applicable.

In one embodiment, the present invention involves software architecture in landline and/or mobile communication systems that includes functionality relating to the intercommunication of applications. FIG. 1 is a block diagram illustrating an exemplary networking environment 100 in which the principles of the present invention are applicable. The networking environment 100 may include, for example, one or more wireless networks 102 and/or landline networks 104. The wireless network(s) 102 may represent any one or more known or future wireless networking technologies, such as the Global System for Mobile Communications (GSM), Universal Mobile Telecommunications System (UMTS), Personal Communications Service (PC S), Time Division Multiple Access (TDMA), Code Division Multiple Access (CDMA), Wideband CDMA (WCDMA), or other mobile network transmission technologies. Other wireless communications means may also couple the various terminals, such as short-range wireless technologies (e.g., Bluetooth). Any wireless device 106 or other communications terminal may be coupled to such wireless network(s) 102, such as mobile phones 108 and other mobile communicators, laptop or other portable computers 110, Personal Digital Assistants (PDA) 112, or any other similar terminal capable of communicating via the wireless network 102, as represented by generic wireless device 114. Any number of wireless devices may be coupled to the wireless network 102, as represented by wireless device-N 116. Other devices or network elements 118, 120 may also be coupled to the wireless network 102. One example of such a network element is a server 118.

Landline network(s) 104 may include a Global Area Network (GAN) such as the Internet, one or more Wide Area Networks (WAN), Local Area Networks (LAN), and the like. Any computing device or other terminal capable of communication may be operable via the landline network 104, such as computers 122, 124 (including desktop, workstations, laptop, conferencing systems, etc.) or any other similar computing device capable of communicating via the network 104. Other devices or network elements 126, 128 may also be coupled to the landline network 104. For example, server 126 may provide content, data, etc. to any one or more other computers 122, 124, wireless devices 106, 116, and/or other servers 118 or other network elements 120, 128. The present invention is applicable with any network element having programs or applications in which communication is desired with other programs/applications. Further, while the present invention is particularly beneficial in networking environments, the present invention is equally applicable to stand-alone systems where communications between applications or application instances occurs.

In the illustrated embodiment of FIG. 1, each of the illustrated network elements includes one or more applications that may communicate with other applications in other network elements. For example, the wireless device includes application(s) 130, the servers 118 and 126 include application(s) 132 and 134 respectively, and the computing device 122 includes application(s) 136. Software used to facilitate communication between such applications is often referred to as application communication "middleware."

The present invention is directed to an aspect of such middleware, e.g., flexible QoS, that facilitates interaction between such applications 130, 132, 134, 136, and/or other applications or other software entities sending data, whereby QoS actions taken by a particular network element are influenced by QoS actions taken by neighboring network elements. Data traversing a network is often referred to as messages, where buffering systems, e.g., message queues, provide a holding location in the network to temporarily store the messages during transit. The Message Queue (MQ) may reside in the computer, server, network element, e.g., a router or a switch, or other system that is sending, forwarding, and/or receiving the messages, whereby a congested situation exists when the MQ is filled beyond a certain threshold. Once the threshold has been reached in a particular network element, the QoS intercedes to ameliorate the congestion condition and then communicates the QoS action taken to a limited number of neighboring network elements. The QoS action taken by one network element may then be saved within a QoS history, e.g., 140–146, of the neighboring network elements. QoS histories may then be used by the neighboring network elements when considering their own QoS action that may be required. As is described in greater detail below, the present invention allows a desired QoS to be obtained through the use of message manipulation within the MQs of network elements, by providing short range visibility of QoS related actions among the various connections that are involved in the message transfer.

Figure 2:
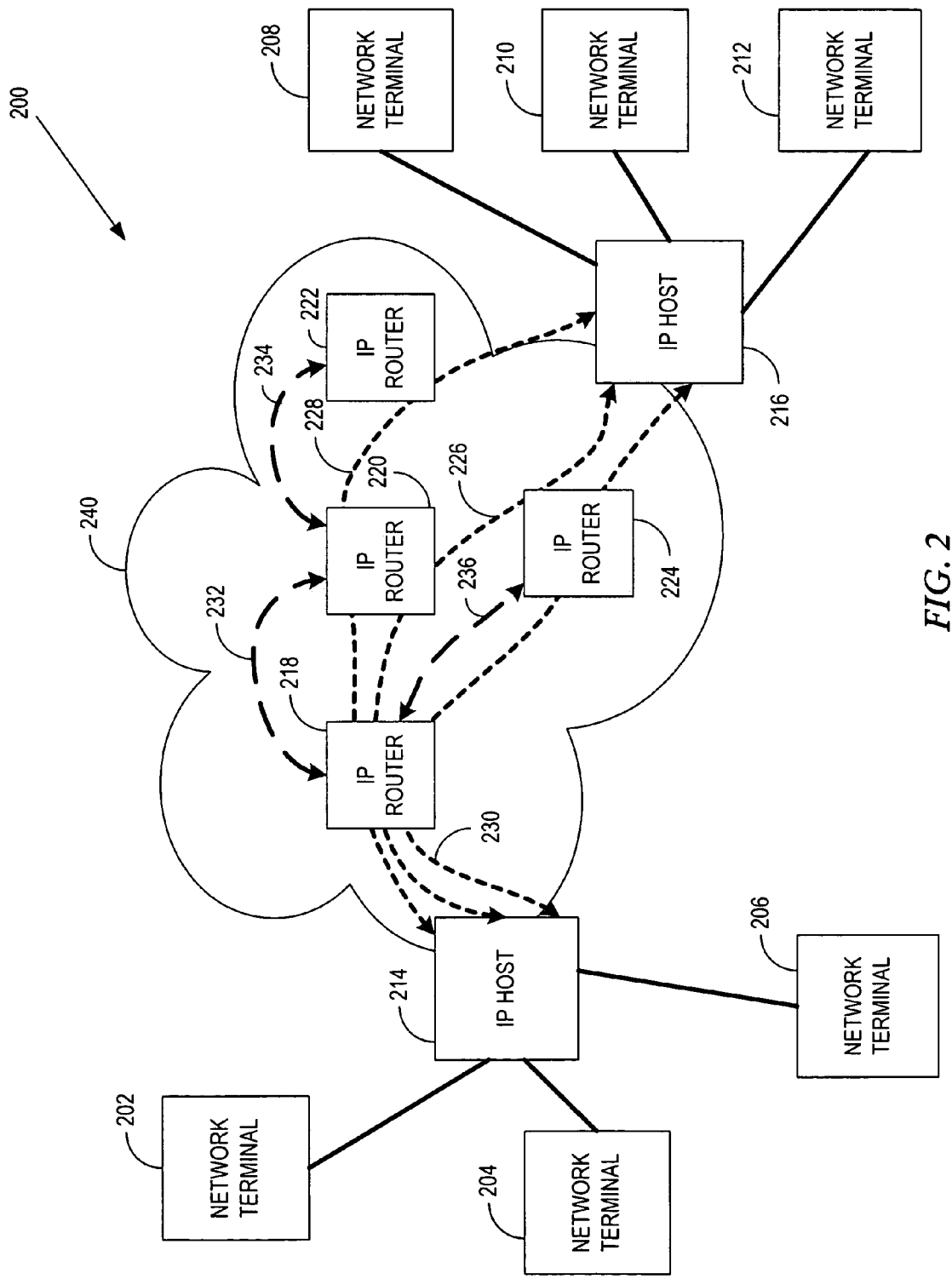
FIG. 2 illustrates an exemplary communication system according to the present invention.

One aspect of the present invention allows connection paths to be set up between network elements of a packet data network, while further allowing signalling to be exchanged between the network elements to communicate the occurrence of a QoS related action under certain circumstances. FIG. 2 illustrates exemplary communication system 200, in which communication paths 226–230 have been created between IP host 214 and IP host 216, through access requests transferred between network terminals 202–212. FIG. 2 may be illustrative of a DiffServ architecture in which traffic entering network 240 is classified and possibly conditioned at the boundaries of network 240, e.g., by ingress network element IP host 214 and egress network element IP host 216, and assigned to different behavior aggregates, where each behavior aggregate may be defined by a DiffServ codepoint contained within an IP packet header. The codepoints may then be forwarded using, for example, in-band signalling, through the interior nodes, e.g., IP routers 218–224, via connection paths 226–230 to effect a particular forwarding treatment, or Per Hop Behavior (PHB), at each network node along its path.

Alternatively, out-of-band signalling may be implemented through the use of connection paths 232–236 via, for example, the Simple Network Management Protocol (SNMP). In such an instance, IP routers 218–224 may exchange their respective QoS actions on connection paths 232–236 via SNMP using UDP/IP as the transport/network protocol, respectively. IP router specific Management Information Base (MIBs) may be used, for example, to communicate statistical, state, configuration and control information that may be available within IP routers 218–224 concerning the local QoS actions that may have been performed on their respective connection paths. QoS actions taken by IP routers 218–224 that may be reported via either of in-band or out-of-band signalling include, but are not limited to: packet drop; delay of packet transfer; prioritized transmission of packets; and modified content of data packets, e.g., through compression or truncation.

An exemplary high level scenario in accordance with the present invention will now be explored, in which in-band signalling is used by IP routers 218–224 to disseminate information regarding QoS actions that may have occurred locally within IP routers 218–224. In the exemplary high level scenario, network terminal 202 may have contacted network terminal 208 to exchange audio information during, for example, a video conference supported by network terminals 202 and 208. Data connection 228 is established through IP routers 218–222, whereby the audio information is exchanged during the video conference. An additional video conference is similarly conducted between network terminals 204 and 210, whereby IP routers 218–220, and 224 forward video information via connection path 226.

IP router 220 is responsible for providing full duplex forwarding services for the audio data exchanged via connection paths 226 and 228. In addition, IP router 220 maintains, among other information, information relating to local QoS actions performed on connection paths 226 and 228. Similarly, IP routers 218, 222, and 224 maintain information relating to their local QoS actions taken with respect to connection paths for which they are currently responsible. IP router 218, for example, maintains information pertaining to the full duplex forwarding services performed on connection paths 226–230; IP router 220 maintains information pertaining to the full duplex forwarding services performed on connection paths 226–228; and IP router 224 maintains information pertaining to the full duplex forwarding services performed on connection paths 226 and 230.

As discussed above, congestion control algorithms executing within IP routers 218–224 may cause a QoS action to be taken, for example, data packets dropped from the connection path when the level of congestion exceeds a congestion threshold. The dropped data packets, however, correspond to streamed audio data being exchanged between network terminals 202, 208 and between network terminals 204, 210 and thus may present, for example, synchronization problems between the corresponding audio codecs. Information related to the dropped data packets are maintained by IP routers 218–224 and, in accordance with the present invention, that information may be communicated among IP routers 218–224 in order to facilitate a limited range visibility of QoS actions taken with respect to a particular portion of network 240. Limited range visibility of QoS actions taken by neighboring IP routers promotes intelligent management of subsequent QoS actions, whereby the accumulation of subsequent QoS actions may be distributed among the various connection paths to minimize the cumulative effects.

In particular, IP router 220 exchanges data streams with IP router 218 via connection paths 226 and 228, and IP router 218 exchanges data streams with IP host 214 via connection paths 226–230. Due to congestion problems, however, IP router 218 may require a packet drop action to be taken in order to conserve memory resources. Accordingly, IP router 218 may steal a data packet from the data stream supported by connection path 226. The packet drop action taken by IP router 218 may then be signalled to IP router 220 and may alternately be signalled to IP router 224, since IP router 224 exists in the forwarding chain with respect to connection path 226. In response to the packet drop action signalled by IP router 218, therefore, IP routers 220 and 224 may update their corresponding information concerning QoS operations taken by neighboring IP routers on connection path 226.

The information maintained by IP routers 220 and 224 may then be used to effectuate intelligent QoS operations taken with respect to congestion problems within IP routers 220 and 224. For example, if congestion within IP router 220 exceeds a congestion threshold, then a packet drop action may be executed by the congestion control algorithm of IP router 220 on either of connection paths 226 or 228. Since a packet drop action on connection path 226 had previously been reported by IP router 218, IP router 220 may then choose to drop a data packet from connection path 228, to avoid successive packet drops from connection path 226. As such, dropped packet actions may be distributed among connection paths 226 and 228, as opposed to sustaining dropped packet actions entirely on either of connection path 226 or 228 individually. In this way, QoS actions may be intelligently distributed to minimize detrimental effects imposed upon, for example, audio codecs within network terminals 202, 204 and network terminals 208, 210. Similarly, IP router 224 may also intelligently distribute QoS actions taken on connection paths 226 and 230 in response to any congestion issues that may be present within IP router 224.

It should be noted that the extent of distribution of QoS actions taken by neighboring network entities may be readily controlled through the use of in-band or out-of-band signalling. In particular, QoS activities taken by IP router 218, for example, may be communicated via in-band signalling through connection paths 226–230 to any one or more of IP routers 220–224. Conversely, QoS activities taken by IP router 218 may be communicated via out-of-band signalling through management/configuration paths 232 or 236 to one or both of IP routers 220 and/or 224. The QoS activity information may then be optionally forwarded to IP router 222 through management/configuration path 234. Accordingly, any level of QoS action distribution within network 240 may be readily implemented.

In one embodiment according to the present invention, network 200 may employ Assured Forwarding (AF), whereby link capacity is shared between selected IP routers in some proportion between four AF classes, i.e., AF1, AF2, AF3, and AF4. Within each AF class, three drop precedence levels exist, i.e., AFx1, AFx2, and AFx3, where x=1, 2, 3, and 4, as is illustrated by the codepoints of Table 1.

TABLE 1

| DROP PRECEDENCE | CLASS 1 | CLASS 2 | CLASS 3 | CLASS 4 |
| --- | --- | --- | --- | --- |
| Low | 001010 | 010010 | 011010 | 100010 |
| Medium | 001100 | 010100 | 011100 | 100100 |
| High | 001110 | 010110 | 011110 | 100110 |

The codepoint having the lowest drop precedence in class 1 of Table 1 corresponds to AF11='001010'. Similarly, the codepoint having the next highest drop precedence in class 1 is AF12='001100'. Progressing through Table 1, it can be verified that the codepoint corresponding to highest drop precedence in class 4 is AF43='100110'.

Returning to the audio streaming example of FIG. 2, the audio streams exchanged through connection paths 226 and 228 may be originally placed, for example, into the AF1 class having drop precedence 2, e.g., AF12, through QoS policies enforced by IP host 214 and 216. Further, IP routers 218–224 allow tracking of data streams of connection paths 226–230 so that a history of data streams having suffered data packet drops may be kept for a configurable amount of time. In the discussion to follow, one exemplary embodiment is illustrated that utilizes the history data to implement flexible QoS according to the present invention.

Figure 3:
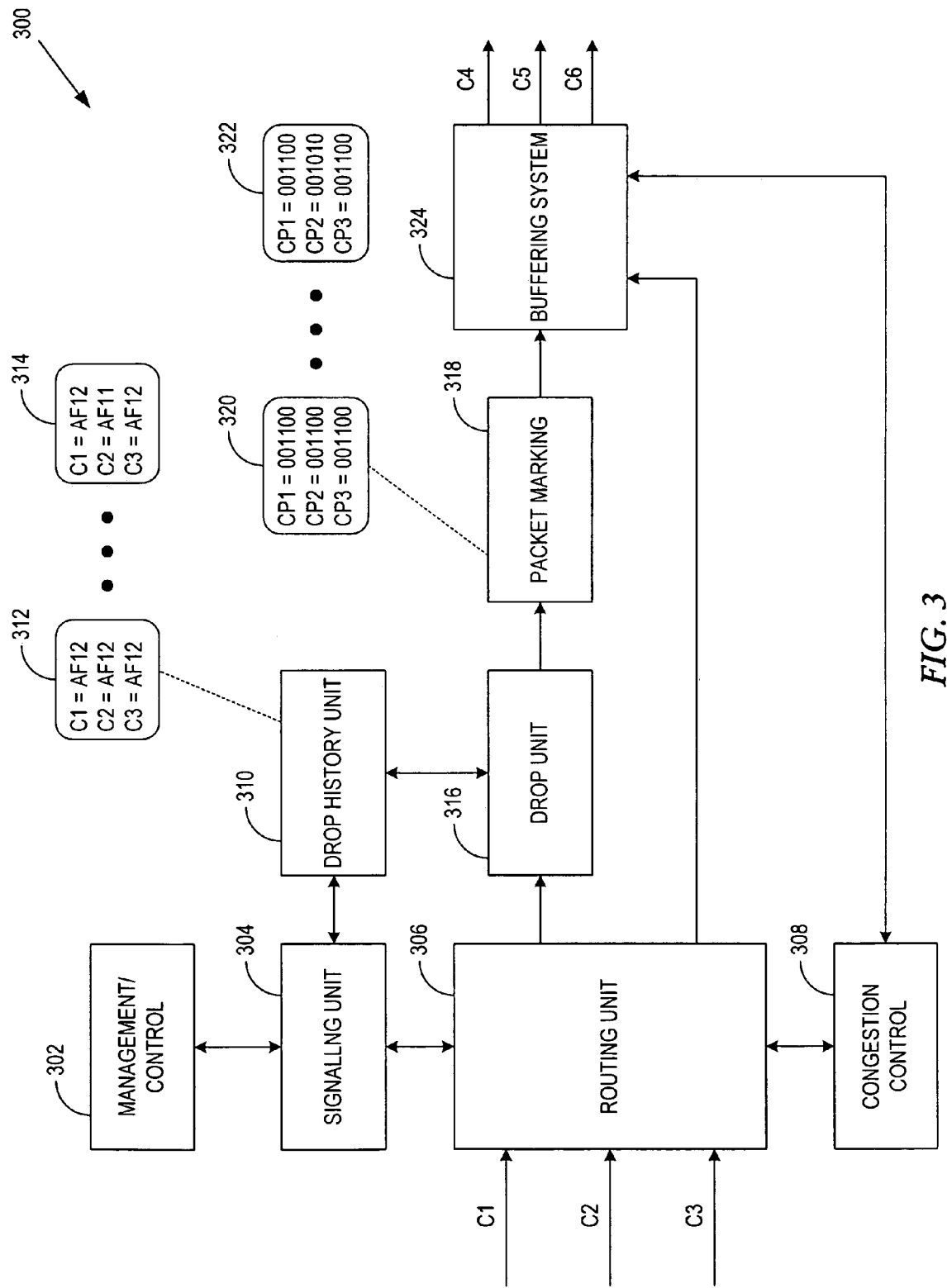
FIG. 3 illustrates an exemplary Internet Protocol (IP) router in accordance with the present invention.

FIG. 3 illustrates exemplary IP router 300 in accordance with the present invention, whereby drop histories, e.g., 312, 314, relating to connection paths C1–C3 may be maintained. The corresponding DiffServ codepoints, e.g., 320, 322, may be modified to reflect the drop histories. IP router 300, for example, routes connection paths C1–C3 via routing unit 306 to connection paths C4–C6 via buffering system, e.g., message queue 324. Congestion control 308 is adapted to monitor the memory resources available within buffering system 324 and compare the memory available with the current loading conditions imposed by the traffic received from connection paths C1–C3. Once the current loading conditions exceeds a loading threshold enforced by the QoS policy of congestion control 308, a determination is made by congestion control 308 to, for example, drop a data packet from one of connection paths C1–C3 and then communicate the drop packet request to drop unit 316 via routing unit 306.

Drop unit 316 accesses drop history unit 310 in order to ascertain the current drop precedence levels, e.g., 312, associated with connection paths C1–C3. Precedence level history 312 indicates that all three connection paths, e.g., C1–C3, are currently executing at AF1 class, precedence level 2. Thus, any one of connection paths C1–C3 may be selected by drop unit 316 for data packet drop since each connection path is currently executing with equal drop precedence. Drop unit 316 may then employ any one of a number of selection algorithms, e.g., round robin, in order to determine which of connection paths C1–C3 will be selected for data packet drop.

Once the connection path is selected, drop unit proceeds to extract a data packet from, for example, connection path C2, which is then reflected by precedence level history 314. In particular, the precedence level history for connection path C2 has changed from AF1 class, precedence level 2, to AF1 class, precedence level 1. As such, any further drop requests made by congestion control 308 will affect either connection path C1 or connection path C3, since they are now executing at a higher precedence level as compared to connection path C2.

In response to the change in the drop precedence level of connection path C2, DiffServ codepoints 320 are accordingly altered to reflect the change. In particular, DiffServ codepoint, e.g., CP2, associated with connection path C2 is changed from '001100' to '001010'. The DiffServ codepoint change is then communicated to the next network entity by packet marking 318, through insertion of DiffServ codepoint CP2, into the IP packet headers associated with data streams propagated by connection path C2. After a configurable amount of time, drop history unit 310 may reset the drop precedence level of connection path C2 to its original precedence level, as shown in precedence level history 312.

It should be noted that each IP packet header propagated by connection paths C1–C6 contains a DiffServ codepoint that relates to its current drop precedence level. If the drop precedence level of a given connection path is not to change, then buffering system 324 receives the data streams directly from routing unit 306. Otherwise, if a drop precedence level of a given connection path is to change, then the appropriate change is made and is then communicated to buffering system 324 via packet marking 318. The change of a drop precedence level, for example, may be necessitated through local QoS actions, or conversely, by QoS actions taken by neighboring IP routers.

In an alternate embodiment, IP router 300 may be configured to monitor the drop histories associated with connection paths C1–C3, as discussed above, but configured to withhold any of the signalling associated with DiffServ codepoint changes to network entities downstream along the connection path. In so doing, propagation of the packet drop history may be contained within any portion of a network desired. For example, referring back to FIG. 2, IP router 218 may be configured to signal any packet drop history changes to IP router 220, whereas IP router 220 may be configured to withhold any such packet drop history change reports to IP router 222. As such, the portion of network 240 having visibility to neighboring QoS actions is limited to IP routers 218 and 220.

In yet another embodiment according to the present invention, packet drop histories are reported via out-of-band signalling protocols to management/control 302. In such an embodiment, for example, SNMP may be used to communicate MIBs associated with the precedence level histories of connection paths C1–C3 by a neighboring network element. Management/control 302 then updates the information to signalling unit 304, which then updates the information maintained by drop history unit 310. In such an instance, DiffServ codepoints are not updated by packet marking 318, nor are they propagated within IP packet headers. Rather, after having dropped a data packet from the appropriate connection path according to the history maintained by drop history unit 310, drop history unit 310 forwards the dropped packet history information to signalling unit 304. Management control 302 is then updated with the new history information by signalling unit 304, which then may forward the history information via SNMP to appropriate neighboring network entities. The neighboring network entities receiving the new history information may be configured as necessary to limit the visibility of QoS actions taken.

Figure 4:
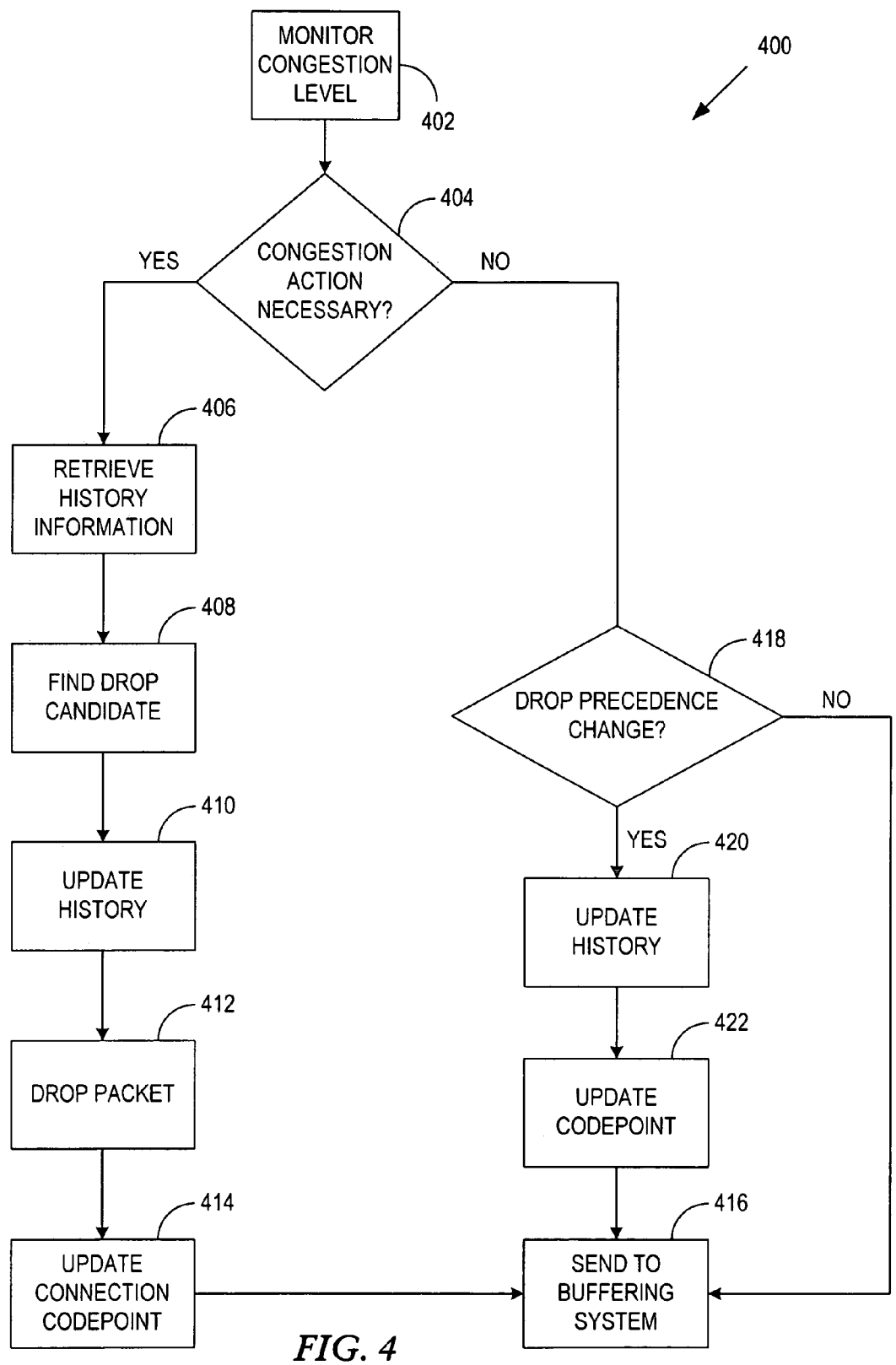
FIG. 4 is an exemplary flow diagram illustrating a method in accordance with the present invention.

FIG. 4 is illustrative of exemplary flow diagram 400 of a method in accordance with the present invention and is explained in relation to IP router 300 of FIG. 3. In step 402, the local congestion level associated with IP router 300 is monitored by congestion control 308 in accordance with appropriate congestion level policies. If a congestion level threshold has been attained as determined in step 404, then the YES path of step 404 is taken, otherwise, the NO path of step 404 is taken. Step 418 is performed so that drop precedence level changes occurring in neighboring network entities may be detected. If drop precedence level changes have been detected as in step 418, then drop precedence levels, e.g., 312, are updated in step 420 to indicate the current drop precedence level for the connection path being updated. The data packet is then forwarded to packet marking 318 so that updates to the DiffServ codepoints, e.g., 320, contained within the IP packet headers may be performed as in step 422. Once updated, the data packet is routed to buffering system 324 as in step 416.

If local congestion action is necessary, however, then a data packet drop history is retrieved from drop history unit 310 as in step 406. Once retrieved, the drop history is used in step 408 to determine the best connection path candidate, e.g., one of connection paths C1–C3, from which the data packet should be taken. The drop precedence levels, e.g., 312, are used to determine, for example, which of the connection paths, e.g., C1–C3, have the highest drop precedence level. In the case of drop precedence levels 312, all connection paths are at equivalent drop precedence, therefore, each of the connection paths are equally as likely to be selected for drop as any other. Taking for example that connection path C2 is chosen, then the drop history is updated to reflect drop precedence level 314 as in step 410, and a data packet from connection path C2 is removed by drop unit 316 as in step 412. The data stream is then forwarded to packet marking 318, so that DiffServ codepoints, e.g., 320, may be altered in step 414 to reflect the drop precedence change for connection C2 as reflected, for example, by DiffServ codepoints 322. The data stream is then forwarded to buffering system 324 as in step 416 for subsequent downstream forwarding.

It should be noted that although a data packet drop operation has been illustrated by FIGS. 3 and 4, any QoS action taken by IP router 300 may be similarly monitored. For example, it may not be necessary to completely drop the data packet from the appropriate connection path. Instead, it may only be necessary to delay the data packet before submission to buffering system 324 for transmission. In such an instance, drop unit 316 may be substituted with a delay unit, whereby a prescribed amount of delay is used in response to the congestion. Once delay of the data packet is determined to be necessary, then the packet is written to the delay unit for the prescribed amount of delay and a delay history unit is then used to update the delay precedence values associated with the affected connection path. A packet marking unit may then be used to mark the connection path data packets with appropriate codepoints to reflect the delayed status of the connection path. Similarly, other QoS actions such as re-prioritization of packets and modification of packet data contents may be monitored and signalled in accordance with the present invention.

Figure 5:
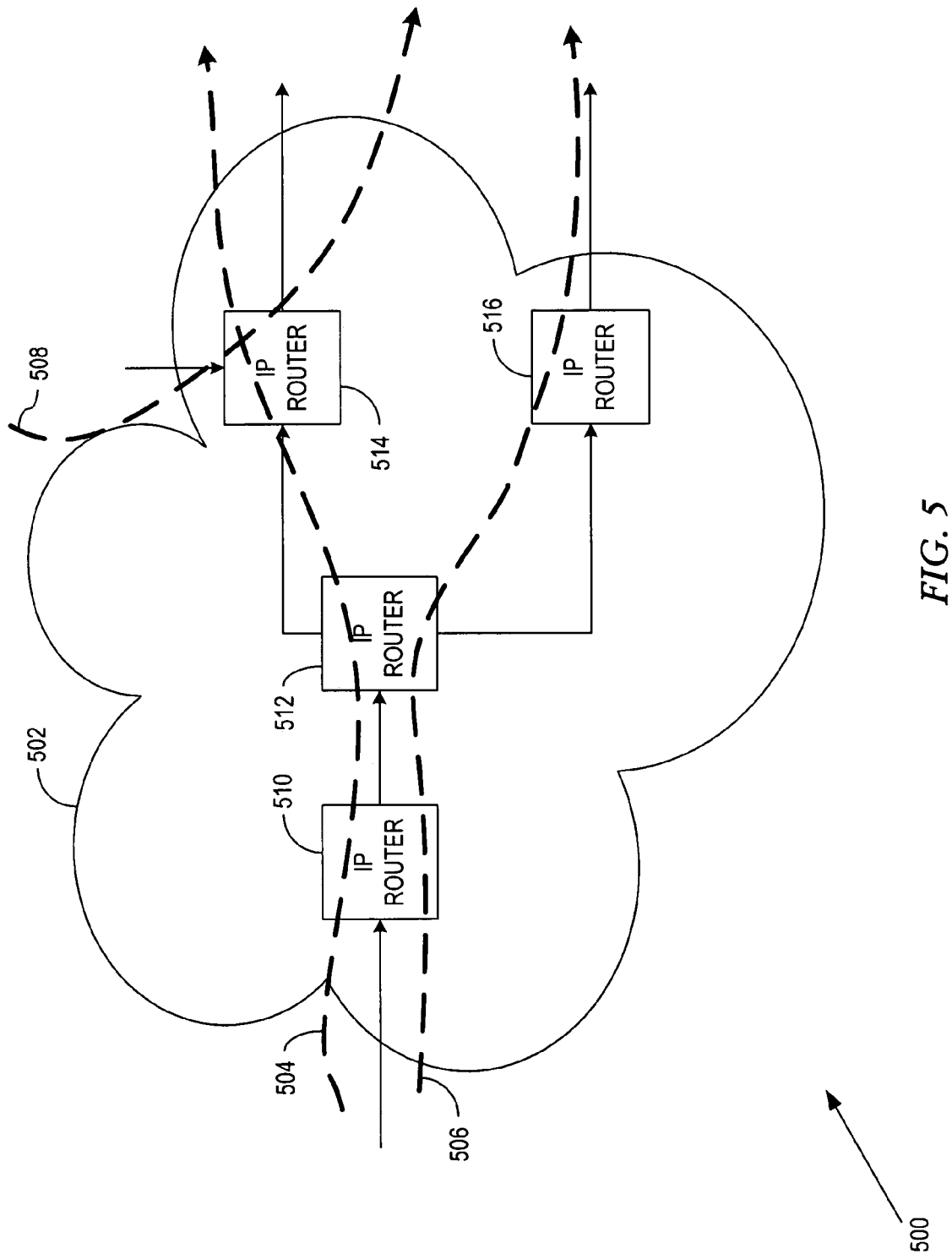
FIG. 5 is an exemplary network illustrating topological fairness employed by the present invention.

As illustrated by FIGS. 3 and 4, the present invention at least provides fairness among data connections that share a portion of the interior nodes of a network. The present invention may also increase fairness topologically, by distributing the effects of congestion to a wider topological area in order to increase fairness among connections as illustrated by network 500 of FIG. 5. Network 502 deploys AF, whereby IP routers 510–516 monitor and react to the AF classes and their associated drop precedence levels associated with connection paths 504–508. Data connections 504–508 represent, for example, audio streams that traverse network 502 via interior nodes, e.g., IP routers 510 516. For example, audio stream 504 traverses IP routers 510, 512, and 514; audio stream 506 traverses IP routers 510, 512, and 516; and audio stream 508 traverses IP router 514. Through congestion balancing, network 502 balances the congestion treatment imposed upon IP routers 510–516, such that the percentage of dropped packets sustained by each of audio streams 504–508 is fairly distributed.

In particular, IP router 510 may become congested due to some other traffic, e.g., business critical TCP traffic, which causes both audio streams 504 and 506 to lose 10% of their respective data packets through QoS actions taken by IP router 510. Subsequently, IP router 514 becomes congested and is also forced to drop a total of 10% from its total audio stream load. In accordance with the present invention, IP router 510 marks both audio streams as having been subject to a QoS action. Subsequently, IP router 514 provides preferential treatment to audio stream 504 due to its prior QoS action, thus causing a smaller percentage of the data packets to be dropped from audio stream 504 by IP router 514, as compared to the percentage of data packets dropped from audio stream 508 by IP router 514.

Accordingly, for example, the total percentage of data packets dropped from audio stream 504 by IP router 514 may be 5% and the total percentage of data packets dropped from audio stream 508 by IP router 514 may be 15%, e.g., 10% dropped by IP router 510 and 5% dropped by IP router 514. Thus, the total percentage of data packets dropped from audio stream 504 is equal to 15%; the total percentage of data packets dropped from audio stream 508 is equal to 15%; and the total percentage of data packets dropped from audio stream 506 is equal to 10%.

In the absence of the present invention, on the other hand, the total percentage of packets that would have been dropped from audio stream 504 would have been equal to 20%, e.g., 10% dropped by IP router 510 and 10% dropped by IP router 514, whereas the total percentage of packets that would have been dropped from each of audio streams 506 and 508 would have been 10%. Thus, the present invention operates to mitigate the disparities of uneven QoS actions by allowing congestion handling to be distributed topologically.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a system and method for flexible QoS actions in accordance with the present invention.

Figure 6:
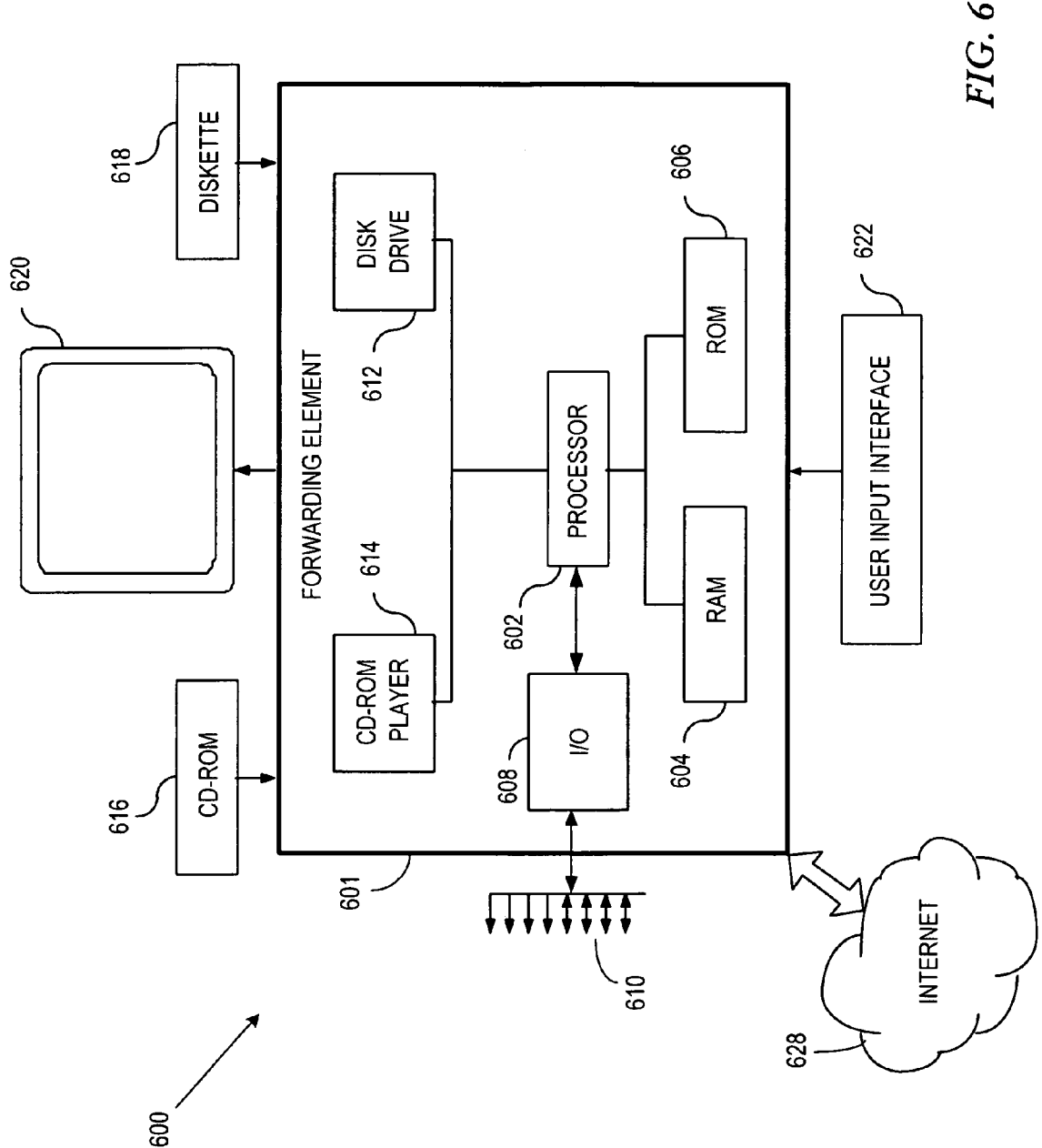
FIG. 6 is a representative computing system capable of carrying out flexible Quality of Service (QoS) actions according to the present invention.

The forwarding elements or other systems for providing QoS actions in connection with the present invention may be any type of computing device capable of processing and communicating digital information. The forwarding element platforms utilize computing systems to control and manage the QoS activity. An example of a representative computing system capable of carrying out operations in accordance with the invention is illustrated in FIG. 6. Hardware, firmware, software or a combination thereof may be used to perform the various QoS actions and operations described herein. The computing structure 600 of FIG. 6 is an example computing structure that can be used in connection with such a forwarding element platform.

The example computing arrangement 600 suitable for performing the QoS activity in accordance with the present invention includes forwarding element 601, which includes a central processor (CPU) 602 coupled to random access memory (RAM) 604 and read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, to provide control signals and the like. For example, QoS information received from I/O connections 608 or Internet connection 628 may be processed in accordance with the present invention. External data storage devices may be coupled to I/O circuitry 608 to facilitate QoS actions according to the present invention. Alternatively, such databases may be locally stored in the storage/memory of forwarding element 601, or otherwise accessible via a local network or networks having a more extensive reach such as the Internet 628. The processor 602 carries out a variety of functions as is known in the art, as dictated by software and/or firmware instructions.

Forwarding element 601 may also include one or more data storage devices, including hard and floppy disk drives 612, CD-ROM drives 614, and other hardware capable of reading and/or storing information such as DVD, etc. In one embodiment, software for carrying out the QoS actions in accordance with the present invention may be stored and distributed on a CD-ROM 616, diskette 618 or other form of media capable of portably storing information. These storage media may be inserted into, and read by, devices such as the CD-ROM drive 614, the disk drive 612, etc. The software may also be transmitted to forwarding element 601 via data signals, such as being downloaded electronically via a network, such as the Internet. Network element 601 is coupled to a display 620, which may be any type of known display or presentation screen, such as LCD displays, plasma display, cathode ray tubes (CRT), etc. A user input interface 622 is provided, including one or more user interface mechanisms such as a mouse, keyboard, microphone, touch pad, touch screen, voice-recognition system, etc.

Forwarding element 601 may be coupled to other computing devices, such as the landline and/or wireless terminals via a network. The server may be part of a larger network configuration as in a global area network (GAN) such as the Internet 628, which allows ultimate connection to the various landline and/or mobile client/watcher devices.

The system and method according to the present invention thus at least promotes fair QoS treatment through the distribution of QoS related actions among various network connections. Additionally, the present invention further allows topological distribution of congestion. Accordingly, the QoS as experienced by the user is increased due to a fairer distribution throughout the network of congestion related actions taken.

The foregoing description of the exemplary embodiment of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method for distributing Quality of Service (QoS) information among network entities to flexibly promote fair congestion processing, comprising:
    monitoring a congestion level of at least one data stream that is processed by a first network entity;
    performing a QoS action at the first network entity that limits consumption of resources of the first network entity by the at least one data stream; and
    communicating the QoS action to a second network entity that subsequently processes the at least one data stream, wherein the second network entity increases a relative precedence for limiting consumption of resources of the second network entity by other data streams processed by the second network entity in order to limit the effect of the QoS action taken on the at least one data stream by the first network entity.

2. The method according to claim 1, wherein monitoring the congestion level comprises:
    receiving data streams from a plurality of network entities;
    storing the data streams within a buffering system; and
    monitoring a storage level of the buffering system.

3. The method according to claim 2, wherein performing the QoS action comprises recording QoS actions taken by the plurality of network entities.

4. The method according to claim 3, wherein performing the QoS action further comprises:
    retrieving the recorded QoS actions; and
    prioritizing the recorded QoS actions into an order starting with the least most recently modified data stream to the most recently modified data stream.

5. The method according to claim 4, wherein performing the QoS action further comprises at least one of dropping data packets, modifying data packets and delaying data packets from the least most recently modified data stream.

6. The method according to claim 1, wherein communicating the QoS action comprises providing signalling information indicative of the QoS action within the data stream.

7. The method according to claim 1, wherein communicating the QoS action comprises providing out-of-band signalling information indicative of the QoS action.

8. A system for distributing Quality of Service (QoS) actions in accordance with precedence priorities to promote fair congestion processing within a network, the system comprising:
    a network element coupled to a boundary of the network;
    a first forwarding terminal coupled to exchange a plurality of data streams with the network element and adapted to implement QoS actions that limit consumption of resources of the first forwarding terminal by en a first portion of the plurality of data streams, the first portion receiving a first precedence priority in response to the QoS actions; and
    a second forwarding terminal coupled to exchange the plurality of data streams with the first forwarding terminal and coupled to receive signalling indicative of the QoS actions implemented by the first forwarding terminal, wherein QoS actions that limit consumption of resources of the second forwarding terminal are performed upon a second portion of the plurality of data streams having a second precedence priority equal to or higher than the first precedence priority in order to limit the effect of the QoS action taken on the first portion of data streams by the first forwarding terminal.

9. The system according to claim 8, wherein the first forwarding terminal comprises:
    a routing unit coupled to receive the plurality of data streams from the network element, the plurality of data streams containing signalling indicative of prior QoS actions;
    a buffering unit adapted to temporarily store the plurality of data streams received from the routing unit;
    a congestion control unit adapted to monitor a storage level of the buffering unit; and
    a QoS unit adapted to perform the QoS actions, wherein the QoS actions taken by the QoS unit are adapted to reduce the storage level of the buffering unit by dropping, modifying or delaying packets of data from the first portion of the plurality of data streams.

10. The system according to claim 9, wherein the first forwarding terminal further comprises a marking unit adapted to mark the first portion of the data streams with the first precedence priority.

11. The system according to claim 8, wherein the second forwarding terminal comprises:
    a routing unit coupled to receive the plurality of data streams from the first forwarding terminal, the plurality of data streams containing signalling indicative of Quality of Service actions taken by the first forwarding terminal;
    a buffering unit adapted to temporarily store the plurality of data streams received from the routing unit;
    a congestion control unit adapted to monitor a storage level of the buffering unit; and
    a Quality of Service (QoS) unit adapted to perform the QoS actions, wherein the QoS actions taken by the QoS unit are adapted to reduce the storage level of the buffering unit by dropping, modifying or delaying packets of data from the plurality of data streams whose signalling indicates a lack of QoS actions taken by the first forwarding terminal.

12. The system according to claim 11, wherein the second forwarding terminal further comprises a marking unit adapted to mark the second portion of the data streams with a precedence priority indicative of the QoS actions taken by the second forwarding terminal.

13. A communication device operable on a network, comprising:
- a routing unit coupled to receive a plurality of data streams from the network, the plurality of data streams containing signalling indicative of prior Quality of Service (QoS) actions taken on the plurality of data streams at network nodes that previously processed the data streams, the QoS actions taken for purposes of limiting consumption of resources by the data streams at the network nodes;
- a buffering unit adapted to temporarily store the plurality of data streams received from the routing unit;
- a congestion control unit adapted to monitor a storage level of the buffering unit; and
- a QoS unit adapted to perform QoS actions on the plurality of data streams, wherein the QoS actions taken by the QoS unit are adapted to reduce the storage level of the buffering unit by acting on packets of data from the plurality of data streams whose signalling indicates a lack of prior QoS actions in order to limit the effect of the QoS actions previously taken by the network nodes.

14. The communication device according to claim 13, wherein the routing unit bypasses the QoS unit if the storage level of the buffering unit is below a storage threshold.

15. The communication device according to claim 14, wherein the routing unit engages the QoS unit if the storage level of the buffering unit is above a storage threshold.

16. The communication device according to claim 15, wherein the QoS unit comprises a QoS action unit coupled to receive the plurality of data streams when the storage threshold is exceeded and adapted to drop, modify or delay the data packets from the plurality of data streams indicating the lack of prior QoS actions.

17. The communication device according to claim 16, wherein the QoS unit further comprises a QoS action history unit coupled to the QoS action unit and adapted to maintain a history or prior QoS actions taken on the plurality of data streams.

18. The communication device according to claim 17, wherein the QoS action history unit is further adapted to maintain a history of QoS actions taken on the plurality of data streams by the QoS action unit.

19. The communication device according to claim 16, wherein the QoS unit further comprises a packet marking unit coupled to the QoS action unit and adapted to mark the plurality of data streams whose data packets were dropped, modified or delayed by the QoS action unit.

20. A computer-readable medium having instructions stored thereon which are executable by a computing system for applying Quality of Service (QoS) actions on data streams exchanged between at least two applications over a network by performing steps comprising:
- receiving data streams from the at least two applications, the data streams including signalling information indicative of prior QoS actions at network nodes that previously processed the data streams, the QoS actions taken for purposes of limiting consumption of resources at the network nodes;
- applying a QoS action on one of the at least two data streams in response to detecting a need to perform the QoS action, wherein the application of the QoS action performs steps comprising:
- retrieving a history of prior QoS actions taken on each of the at least two data streams;
- prioritizing the history of prior QoS actions, wherein prior QoS actions taken most recently receive a low priority;
- selecting one of the at least two data streams having a priority level equal to or greater than the low priority; and
- applying the QoS action to the selected data stream in order to limit the effect of the QoS actions taken on any of the at least two data streams having low priorities.

* * * * *